United States Patent
Ohara et al.

(10) Patent No.: US 11,432,330 B2
(45) Date of Patent: Aug. 30, 2022

(54) USER APPARATUS, AND RANDOM ACCESS PREAMBLE TRANSMISSION METHOD

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 198 days.

(21) Appl. No.: 16/495,236

(22) PCT Filed: Mar. 23, 2017

(86) PCT No.: PCT/JP2017/011877
§ 371 (c)(1),
(2) Date: Sep. 18, 2019

(87) PCT Pub. No.: WO2018/173229
PCT Pub. Date: Sep. 27, 2018

(65) Prior Publication Data
US 2021/0289557 A1    Sep. 16, 2021

(51) Int. Cl.
*H04W 74/08* (2009.01)
*H04W 74/00* (2009.01)
*H04W 72/04* (2009.01)
*H04W 72/00* (2009.01)
*H04W 52/36* (2009.01)

(52) U.S. Cl.
CPC ....... *H04W 74/0833* (2013.01); *H04W 52/36* (2013.01); *H04W 72/005* (2013.01); *H04W 72/046* (2013.01); *H04W 74/008* (2013.01)

(58) Field of Classification Search
CPC ........... H04W 74/0833; H04W 74/008; H04W 52/36; H04W 72/046; H04W 72/005
See application file for complete search history.

(56) References Cited

U.S. PATENT DOCUMENTS

| | | | |
|---|---|---|---|
| 2009/0011786 A1* | 1/2009 | Lee | H04W 52/50 455/522 |
| 2014/0016573 A1* | 1/2014 | Nuggehalli | H04B 7/0617 370/329 |
| 2014/0376466 A1* | 12/2014 | Jeong | H04W 74/0833 370/329 |
| 2017/0251460 A1* | 8/2017 | Agiwal | H04W 72/0406 |
| 2018/0020487 A1* | 1/2018 | Tsai | H04W 74/004 |
| 2019/0342925 A1* | 11/2019 | Zhang | H04W 52/325 |
| 2020/0296765 A1* | 9/2020 | Kim | H04W 74/0833 |

(Continued)

OTHER PUBLICATIONS

International Search Report issued in Application No. PCT/JP2017/011877, dated Jun. 13, 2017 (5 pages).

(Continued)

*Primary Examiner* — Ivan O Latorre
(74) *Attorney, Agent, or Firm* — Osha Bergman Watanabe & Burton LLP

(57) ABSTRACT

A user apparatus in a radio communication system that includes a base station and the user apparatus includes a transmission unit that transmits a random access preamble with the use of a beam out of a plurality of beams; and a counter retaining unit that has, for each beam, a counter that indicates the number of times of power ramping performed in transmission of a random access preamble.

5 Claims, 14 Drawing Sheets

(56) References Cited

U.S. PATENT DOCUMENTS

2021/0136823 A1\* 5/2021 Kim .................... H04W 56/00

OTHER PUBLICATIONS

Written Opinion issued in International Application No. PCT/JP2017/011877, dated Jun. 13, 2017 (3 pages).
3GPP TS 36.321 V14.1.0; "3rd Generation Partnership Project; Technical Specification Group Radio Access Network; Evolved Universal Terrestrial Radio Access (E-UTRA); Medium Access Control (MAC) protocol specification (Release 14)" Dec. 2016, (98 pages).
3GPP TSG RAN WG1 Meeting #88; R1-1702831; "Discussion on 4-step random access procedure for NR;" NTT DOCOMO; Feb. 13-17, 2017; Athens, Greece (10 pages).
3GPP TSG RAN WG1 Meeting #88; R1-1701848; "On RACH retransmission;" Mitsubishi Electric; Feb. 13-17, 2017; Athens, Greece (6 pages).
Office Action issued in Japanese Application No. 2019-506862; dated Mar. 2, 2021 (5 pages).
Office Action in counterpart Japanese Patent Application No. 2019-506862 dated Oct. 26, 2021 (4 pages).

\* cited by examiner

FIG.8

| VALUE OF COUNTER OF TOTAL NUMBER OF TIMES OF TRANSMISSION | VALUE OF counter1 | VALUE OF counter2 | VALUE OF counter3 |
|---|---|---|---|
| Tcounter: 1 | counter1: 1 | counter2: 0 | counter3: 0 |
| Tcounter: 2 | counter1: 2 | counter2: 0 | counter3: 0 |
| Tcounter: 3 | counter1: 2 | counter2: 1 | counter3: 0 |
| Tcounter: 4 | counter1: 2 | counter2: 2 | counter3: 0 |
| Tcounter: 5 | counter1: 3 | counter2: 2 | counter3: 0 |

FIG.11

| VALUE OF COUNTER OF TOTAL NUMBER OF TIMES OF TRANSMISSION | VALUE OF counter1 | VALUE OF counter2 | VALUE OF counter3 |
|---|---|---|---|
| Tcounter: 1 | counter1: 1 | counter2: 0 | counter3: 0 |
| Tcounter: 2 | counter1: 1 | counter2: 1 | counter3: 0 |
| Tcounter: 3 | counter1: 1 | counter2: 1 | counter3: 1 |
| Tcounter: 4 | counter1: 2 | counter2: 1 | counter3: 1 |
| Tcounter: 5 | counter1: 2 | counter2: 2 | counter3: 1 |
| Tcounter: 6 | counter1: 2 | counter2: 2 | counter3: 2 |
| Tcounter: 7 | counter1: 3 | counter2: 2 | counter3: 2 |

FIG.13

| VALUE OF COUNTER OF TOTAL NUMBER OF TIMES OF TRANSMISSION | VALUE OF counter1 | VALUE OF counter2 | VALUE OF counter3 |
|---|---|---|---|
| Tcounter: 1 | counter1: 1 | counter2: 0 | counter3: 0 |
| Tcounter: 2 | counter1: 2 | counter2: 0 | counter3: 0 |
| Tcounter: 3 | counter1: 3 | counter2: 0 | counter3: 0 |
| Tcounter: 4 | counter1: 3 | counter2: 1 | counter3: 0 |
| Tcounter: 5 | counter1: 3 | counter2: 2 | counter3: 0 |
| Tcounter: 6 | counter1: 3 | counter2: 3 | counter3: 0 |
| Tcounter: 7 | counter1: 3 | counter2: 3 | counter3: 1 |

USER APPARATUS, AND RANDOM ACCESS PREAMBLE TRANSMISSION METHOD

TECHNICAL FIELD

The present invention relates to a user apparatus in a radio communication system.

BACKGROUND ART

According to LTE (Long Term Evolution), random access (RA) is performed by a user apparatus to establish connection with a base station, to perform resynchronization, or the like (a Non-patent Reference No. 1). According to LTE, in random access, in a case where a user apparatus has not received a RAR (Random Access Response) after transmitting a RA preamble, the user apparatus performs power ramping where retransmission is performed while transmission power is increased through a predetermined step.

Concerning 3GPP (3rd Generation Partnership Project), study for a radio communication scheme called NR (New Radio) or 5G is in progress for increasing a system capacity, increasing a data transmission speed, reducing a delay in a radio section, and so forth. Concerning NR, various radio technologies have been studied in order to fulfill requirements of achieving a throughput greater than or equal to 10 Gbps and reducing a delay in a radio section to less than or equal to 1 ms at the same time.

In NR, it is expected to use a wide band from a low frequency band similar to LTE up to a frequency band higher than in LTE. In particular, because a propagation loss increases in a high frequency band, a study has been made for using a beamforming technology of forming a beam having a narrow beam width for compensating the increase in the propagation loss.

In a case of transmitting a signal with the use of beamforming, as a result of a base station or a user apparatus performing beam sweeping, it may be considered to determine a direction of a transmission beam in such a manner that reception quality may become satisfactory at a communication counterpart. In the same way, also in a case of receiving a signal with the use of beamforming, it may be considered to determine a direction of a reception beam in such a manner that reception quality at a time of receiving a signal from a communication counterpart may become satisfactory.

PRIOR ART REFERENCE

Non-Patent Reference

Non-patent Reference No. 1: 3GPP TS 36.321 V14.1.0 (2016-12)

SUMMARY OF THE INVENTION

Problem to be Solved by the Invention

Also in NR, it is expected to perform a random access procedure similar to a random access procedure in LTE, and it is expected that a user apparatus performs retransmission with the use of power ramping. Also, in NR, it is expected to use transmission beamforming at a time of transmitting a RA preamble. In this case, at a time of retransmitting a RA preamble, a user apparatus may change a transmission beam from a transmission beam of the previous transmission by performing beam switching.

At a time of performing power ramping, a user apparatus manages the magnitude of transmission power of a RA preamble by managing the number of times of power ramping with the use of a power ramping counter.

For example, it may be considered that a user apparatus has a single power ramping counter common to all the transmission beams, performs power ramping at a time of retransmission, and increases the power ramping counter irrespective of a transmission beam. Further, it may also be considered to use transmission power equivalent to previous transmission power at a time of performing beam switching in retransmission, and to perform power ramping at a time of not performing beam switching. In such cases, when the user apparatus changes a transmission beam, the user apparatus performs retransmission on the basis of the transmission power of the transmission beam before being changed. However, characteristics of the transmission beam may considerably depend on each transmission beam. Therefore, uselessly great transmission power may be used and the transmission may be inefficient. In addition, interference to another cell or the like may increase.

Further, it may also be considered that a user apparatus has a single power ramping counter common to all the transmission beams and resets the power ramping counter each time of changing a transmission beam. However, in this case, because the user apparatus performs retransmission with initial transmission power with a changed transmission beam, the number of times of retransmission may increase and the transmission may be inefficient.

Thus, the prior art has a problem that, in a case of using beam switching in a random access procedure, it may be impossible to perform efficient transmission of a RA preamble.

The present invention has been devised in consideration of the above-mentioned problem, and an object is to provide a technology with which, in a radio communication system that includes a user apparatus and a base station and uses beam switching in a random access procedure, the user apparatus can transmit a random access preamble efficiently.

MEANS TO SOLVE THE PROBLEM

According to a disclosed technology, a user apparatus is provided in a radio communication system that includes a base station and the user apparatus. The user apparatus includes:
a transmission unit that transmits a random access preamble with the use of a beam out of a plurality of beams; and
a counter retaining unit that has, for each beam, a counter that indicates the number of times of power ramping that is performed in transmission of a random access preamble.

Advantageous Effects of the Invention

According to the disclosed technology, it is possible to provide a technology with which, in a radio communication system that includes a user apparatus and a base station and uses beam switching in a random access procedure, the user apparatus can transmit a random access preamble efficiently.

BRIEF DESCRIPTION OF THE DRAWINGS

FIG. 8 illustrates an example of operations of the user apparatus 10 according to the first embodiment.

FIG. 11 illustrates an example of operations of the user apparatus 10 according to the second embodiment.

FIG. 13 illustrates an example of operations of the user apparatus 10 according to the second embodiment.

MODE FOR CARRYING OUT THE INVENTION

Below, a mode for carrying out the present invention (a present carrying-out mode) will be described with reference to drawings. Note that the carrying-out mode that will now be described is merely one example, and a carrying-out mode according to the present invention is not limited to the carrying-out mode that will now be described.

When a radio communication system according to the present carrying-out mode operates, the radio communication system can appropriately use existing technologies. In this regard, the existing technologies include, for example, existing LTE. However, the existing technologies are not limited to the existing LTE. Further, "LTE" used herein has, unless otherwise noted, a wide meaning covering LTE-Advanced and schemes (for example, NR) developed after LTE-Advanced.

Furthermore, in the description of the carrying-out mode that will now be made, terms such as random access, RA preamble, RAR, RAR window, SIB, PUSCH, and so forth used in the existing LTE will be used. However, the reason therefor is a convenience for description. Therefore, signals, functions, and so forth same as or similar to the above-mentioned random access, RA preamble, RAR, RAR window, SIB, PUSCH, and so forth may be called other names.

Furthermore, in the description of the present carrying-out mode, a random access procedure based on a random access procedure prescribed for LTE is used as an example. However, the applications for which the present invention is used are not limited to the random access procedure based on a random access procedure prescribed for LTE.

Below, first, an entire configuration of a system and an example of basic operations of a random access procedure will be described as a basic example. Then, first and second embodiments that are embodiments of the present invention will be described. The first and second embodiments are based on the basic example. However, alternatively, the first and second embodiments may be based on a random access scheme for performing operations different from those of the basic example that will now be described.

BASIC EXAMPLE

<Overall System Configuration>

Figure 1:
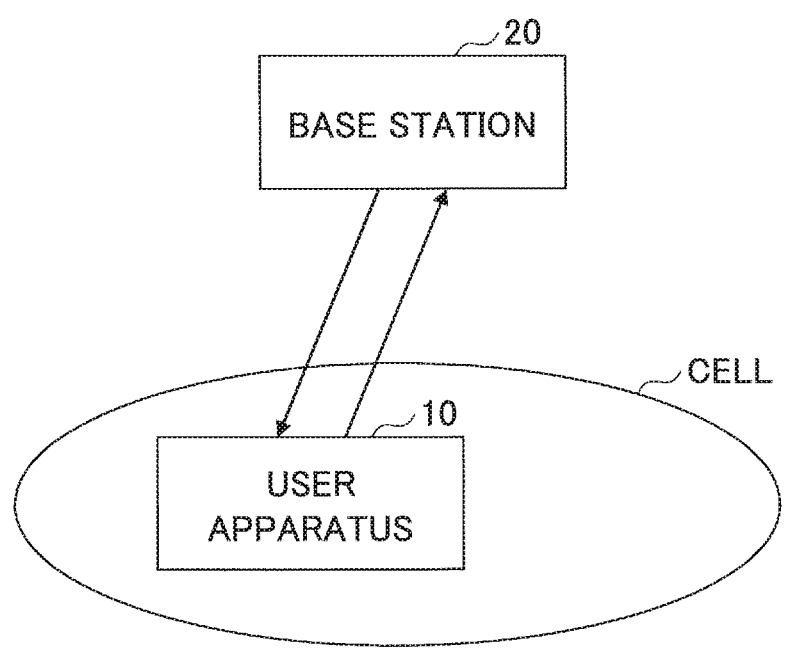
FIG. 1 is a configuration diagram of a radio communication system according a mode for carrying out the present invention.

FIG. 1 illustrates a radio communication system according to the present carrying-out mode. The radio communication system according to the present carrying-out mode includes, as illustrated in FIG. 1, a user apparatus 10 and a base station 20. In FIG. 1, the single user apparatus 10 and the single base station 20 are illustrated. However, this is an example, and there may be a plurality of the user apparatuses 10 and a plurality of the base stations 20.

The user apparatus 10 is a communication apparatus having a radio communication function such as a smartphone, a cellular phone, a tablet, a wearable terminal, or a communication module for M2M (Machine-to-Machine). The user apparatus 10 is connected with the base station 20 in a wireless manner and uses various communication services provided by the radio communication system. The base station 20 provides one or more cells, and is a communication apparatus that performs radio communication with the user apparatus 10. Each of the user apparatus 10 and the base station 20 can perform beamforming for transmitting or receiving a signal.

In the present carrying-out mode, a duplex scheme may be a TDD (Time Division Duplex) scheme or a FDD (Frequency Division Duplex) scheme.

In addition, hereinafter, transmission of a signal with the use of a transmission beam has the same meaning as transmission of a signal multiplied with a precoded vector (or precoded with a precoding vector). In the same way, reception with the use of a reception beam has the same meaning as multiplying a received signal with a predetermined weight vector. In addition, transmission of a signal with the use of a transmission beam may be expressed also as transmission of a signal with the use of a specific antenna port. In the same way, reception of a signal with the use of a reception beam may be expressed also as reception of a signal with the use of a specific antenna port. The antenna port means a logical antenna port defined in a 3GPP standard. Note that methods of forming a transmission beam and a reception beam are not limited to the above-mentioned methods. For example, also a method of changing angles of respective antennas of the user apparatus 10 or the base station 20 may be used. Also a method of combining the method of using a precoding vector with the method of changing angles of antennas may be used. Also another method may be used.

Hereinafter, a beam used for transmitting a signal from the base station 20 will be referred to as a BS transmission beam; a beam used for receiving a signal by the base station 20 will be referred to as a BS reception beam; a beam used for transmitting a signal from the user apparatus 10 will be referred to as a UE transmission beam; and a beam used for receiving a signal by the user apparatus 10 will be referred to as a UE reception beam.

<Random Access Procedure>

Figure 2:
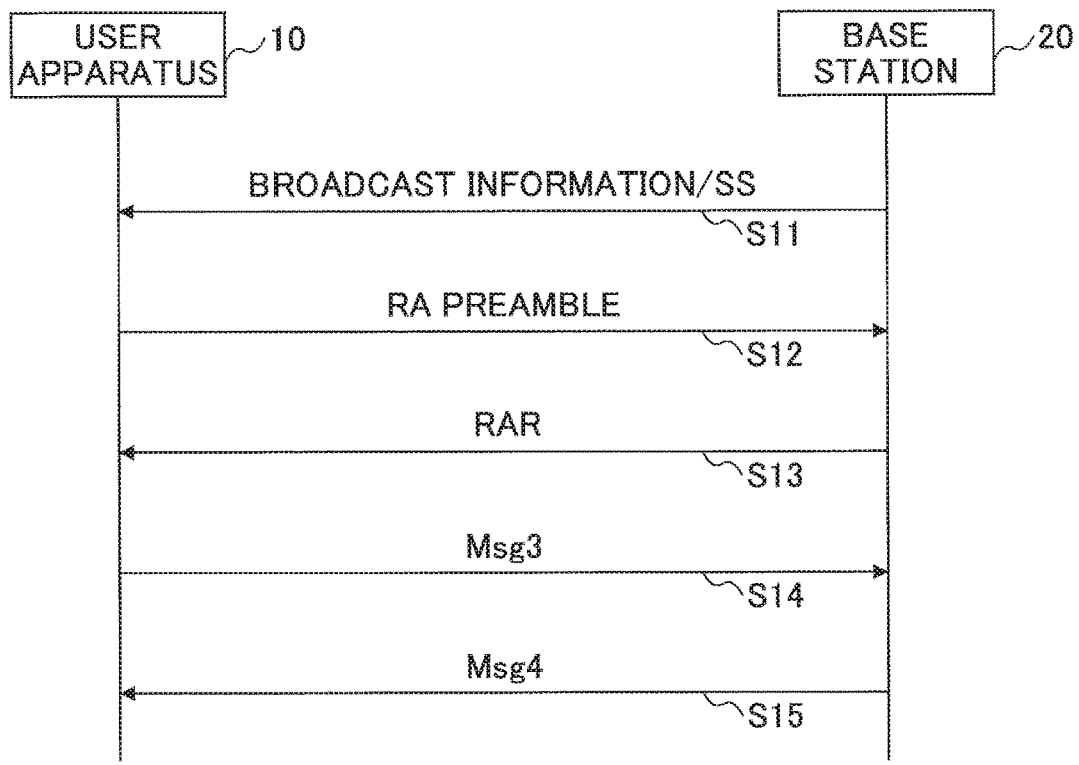
FIG. 2 illustrates an example of a random access procedure.

With reference to FIG. 2, an example of a random access procedure (an example of contention based) according to the present carrying-out mode will be described. The present carrying-out mode performs a random access procedure where power ramping is performed (Non-patent Reference No. 1) similar to a random access procedure used in LTE, for example. It is noted that, when signals are transmitted and received in a random access procedure, each of the user apparatus 10 and the base station 20 uses a transmission beam and a reception beam. Further, some signal transmission or reception operations may be omni-transmission or omni-reception operations.

The base station 20 performs beam sweeping to transmit broadcast information and a synchronization signal (hereinafter, referred to as SS) in each BS transmission beam at respective predetermined periods (step S11). The transmission periods of the broadcast information and the synchronization signal may be the same as each other or may be different from each other. Further, also a SIB (System Information Block) described later is transmitted with each BS transmission beam at a predetermined period. The SIB may also be called "system information".

Figure 3:
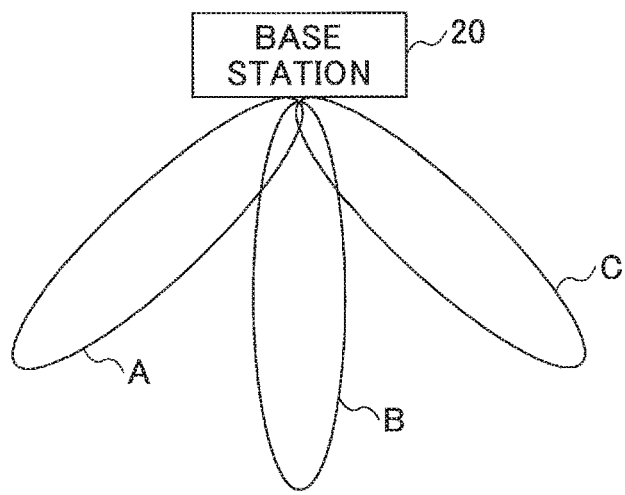
FIG. 3 illustrates beams to be transmitted from a base station 20.

FIG. 3 illustrates an image of the BS transmission beams. In the example of FIG. 3, three A, B, and C BS transmission beams are illustrated. With each of the three BS transmission beams, broadcast information, SS, SIB, and so forth are transmitted. During beam sweeping, a BS transmission beam is switched at each time period (for example, for each symbol), for example.

The broadcast information is basic system information (corresponding to a MIB in LTE) transmitted via a PBCH, for example. There are two types of signals (code sequences) as SS, i.e., a P-SS and a S-SS, for example. The P-SS is a signal for the purpose of symbol timing synchronization or the like, for example. The S-SS is a signal for the purpose of radio frame synchronization or the like, for example.

The user apparatus 10 can identify a BS transmission beam by receiving broadcast information or SS or by receiving "broadcast information and SS" with the BS transmission beam. Identifying a BS transmission beam means, for example, detecting an identifier (ID) of the BS transmission beam. The ID of a BS transmission beam may be an antenna port number. For example, the ID of a BS transmission beam may be included in broadcast information or may be included in a SS. Further, the ID of a BS transmission beam may be associated with resources (time and/or frequency resources) with which broadcast information or a SS is transmitted, and the user apparatus 10 may identify the BS transmission beam with the use of the resources with which the broadcast information or the SS is received.

A block that includes any one of P-SS, S-SS, and broadcast information may be called a SS-block. The user apparatus 10 being able to receive a SS-block transmitted from the base station 20 (i.e., able to identify the contents of the SS-block) may be regarded as the user apparatus 10 being able to identify the BS transmission beam associated with the SS-block. In this case, the user apparatus 10 identifies the ID of the BS transmission beam with the use of the contents of the received SS-block or with the use of the resources with which the SS-block is received, for example.

In a case where resources for a SS-block are associated with a BS transmission beam, the "ID of the BS transmission beam" that the user apparatus 10 identifies should not necessarily be an ID (referred to as a "beam ID") allocated for the BS transmission beam. For example, a time position of the SS-block (for example, a symbol index) is associated with a BS transmission beam, and also, is associated with a RACH resource subset that is of resources for transmitting a RA preamble. In this case, the time position (for example, the symbol index) can be considered as the "ID of the BS transmission beam". In this case, what the user apparatus 10 is to perform is only to recognize the time position (for example, the symbol index) of the SS-block. Further, in this case, for example, the beam ID may be included in the broadcast information.

Resources for a SS-block being associated with a BS transmission beam means, for example, that, in a case where there are a BS transmission beam A and a BS transmission beam B, the same BS transmission beam A is used for a symbol A each time at a cycle of a certain time unit and the same BS transmission beam B is used for a symbol B each time at a cycle of a certain time unit.

In a case where resources for a SS-block are not associated with a BS transmission beam, the base station 20 transmits broadcast information that includes a beam ID to the user apparatus 10, and the user apparatus 10 identifies the BS transmission beam by reading the beam ID transmitted in the broadcast information, for example.

A technology according to the present carrying-out mode can use either one of the above-mentioned two patterns. In step S12 of FIG. 2, the user apparatus 10 transmits a RA preamble (Message1) with the use of resources (referred to as a RACH resource subset) corresponding to a BS transmission beam of broadcast information and/or SS (referred to as "broadcast information/SS") that has been able to be received in step S11.

In response to detecting the RA preamble, the base station 20 transmits a RA response (RAR, Message2) that is a response thereto to the user apparatus 10 (step S13). In response to receiving the RA response, the user apparatus 10 transmits Message3 that includes predetermined information to the base station 20 (step S14). Message3 is, for example, a RRC connection request.

In response to receiving Message3, the base station 20 transmits Message4 (for example, a RRC connection setup) to the user apparatus 10. In response to determining that the predetermined information is included in Message4, the user apparatus 10 determines that Message4 is Message4 addressed to the user apparatus 10 in response to Message3, and ends the random access procedure. In contrast, in a case where the user apparatus 10 cannot determine that the predetermined information is included in Message4, the user apparatus 10 determines that the random access is unsuccessful, and again performs the procedure from transmission of a RA preamble.

<RA Preamble Transmission Method>

An example of a RA preamble transmission method in the above-mentioned step S12 will now be described in further detail.

According to the present carrying-out mode, the user apparatus 10 selects a set of broadcast information/SS that has been able to be received from among a plural sets of broadcast information/SS transmitted from the base station 20 through beam sweeping. This is the same as selecting the BS transmission beam with which the set of broadcast information/SS that has been able to be received is transmitted. The above-mentioned "has been able to be received" means that the broadcast information/SS has been able to be received with satisfactory reception quality, for example. However, what is meant by the above-mentioned "has been able to be received" is not limited thereto.

According to the present carrying-out mode, a BS transmission beam from the base station 20 is associated with a RACH resource subset that is of resources to be used by the user apparatus 10 to transmit a RA preamble. The user apparatus 10 transmits a RA preamble with the use of the RACH resource subset corresponding to the selected BS transmission beam.

Figure 4:
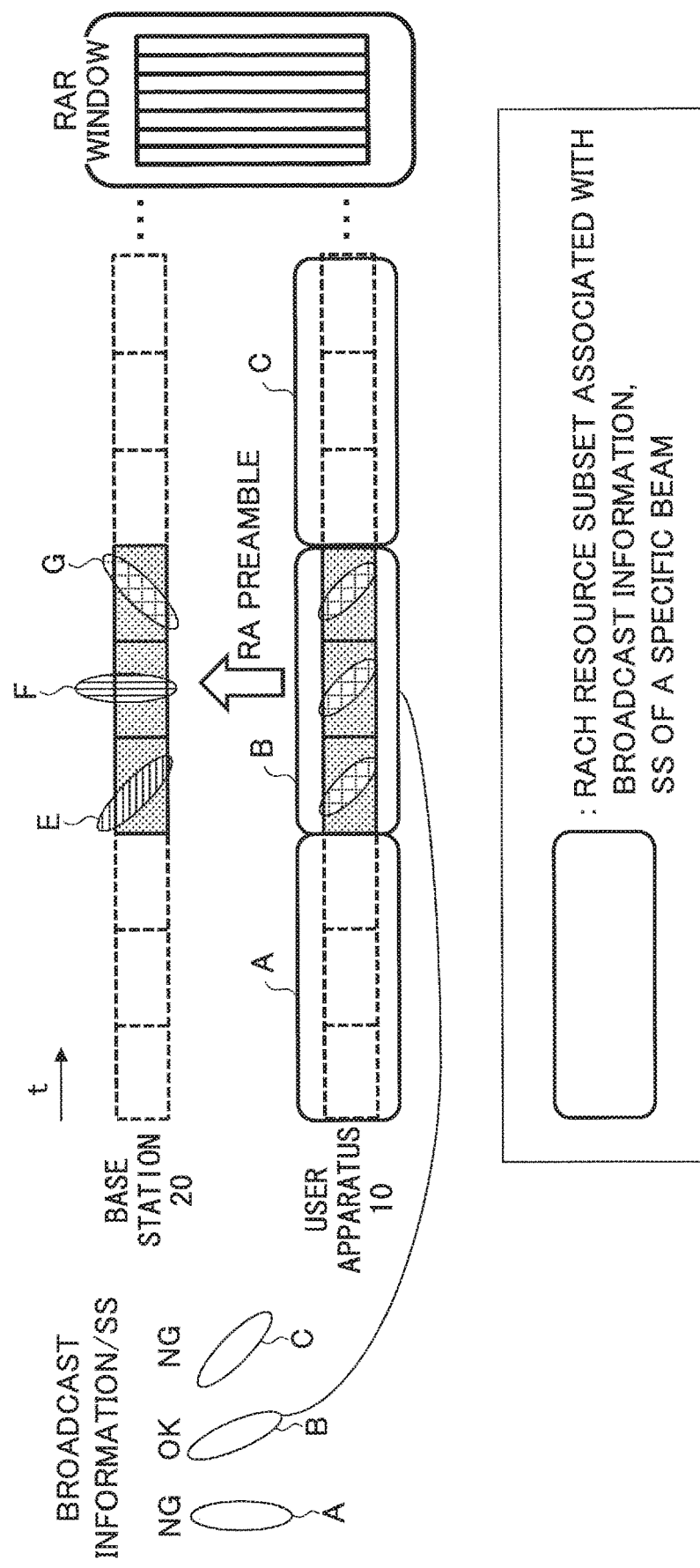
FIG. 4 illustrates a RA preamble transmission method.

For example, FIG. 4 illustrates RACH resource subsets A, B, and C at the user apparatus 10. The RACH resource subsets A, B, and C correspond to, for example, BS transmission beams A, B, and C such as those illustrated in FIG. 3. Note that according to FIG. 4, the plurality of RACH resource subsets are divisions along a time direction to be associated with the respective BS transmission beams. However, this is merely one example. A plurality of RACH resource subsets may be divisions along a frequency direction to correspond to respective BS transmission beams. Further alternatively, a plurality of RACH resource subsets may be divisions in time and frequency units to be associated with respective BS transmission beams.

The example of FIG. 4 is a case where the user apparatus 10 has been able to receive broadcast information/SS transmitted with a BS transmission beam B, and the user apparatus 10 transmits a RA preamble with the RACH resource subset B corresponding to the BS transmission beam B. Note that, in a frame of the RACH resource subset B of FIG. 4, images of UE transmission beams are illustrated.

The base station 20 can determine broadcast information/SS (a BS transmission beam) received by the user apparatus 10 on the basis of resources for a RA preamble received from the user apparatus 10. In the example of FIG. 4, the base station 20 receives a RA preamble through a RACH resource subset B. Therefore, the base station 20 can determine that the BS transmission beam B corresponding to the RACH resource subset B is a suitable BS transmission beam that can be received by the user apparatus 10. For example, the base station 20 can use the BS transmission beam B for transmitting a signal to the user apparatus 10 thereafter. Note that, in FIG. 4, beams E, F, and G at the base station 20 represent BS reception beams. In this example, as illustrated, the base station 20 performs beam sweeping at the reception side.

Further, FIG. 4 illustrates a RAR window. According to the present carrying-out mode, in the same manner as an existing LTE, the user apparatus 10 which has transmitted a RA preamble performs monitoring to detect a RA response within a predetermined time period defined by the RAR window, and determines that the random access is unsuccessful in a case of not receiving the RA response. However, this is one example, and another process than the existing LTE may be performed as the random access successful/unsuccessful determining process.

FIG. 4 illustrates an example where the user apparatus 10 has been able to receive broadcast information/SS with a single BS transmission beam. FIG. 4 also illustrates an example where the user apparatus 10 has been able to receive broadcast information/SS with a plurality of BS transmission beams, and selects one BS transmission beam with which the broadcast information/SS has been able to be received most satisfactorily (for example, the broadcast information/SS received with the BS transmission beam has the best reception quality) from among the plurality of BS transmission beams.

Figure 5:
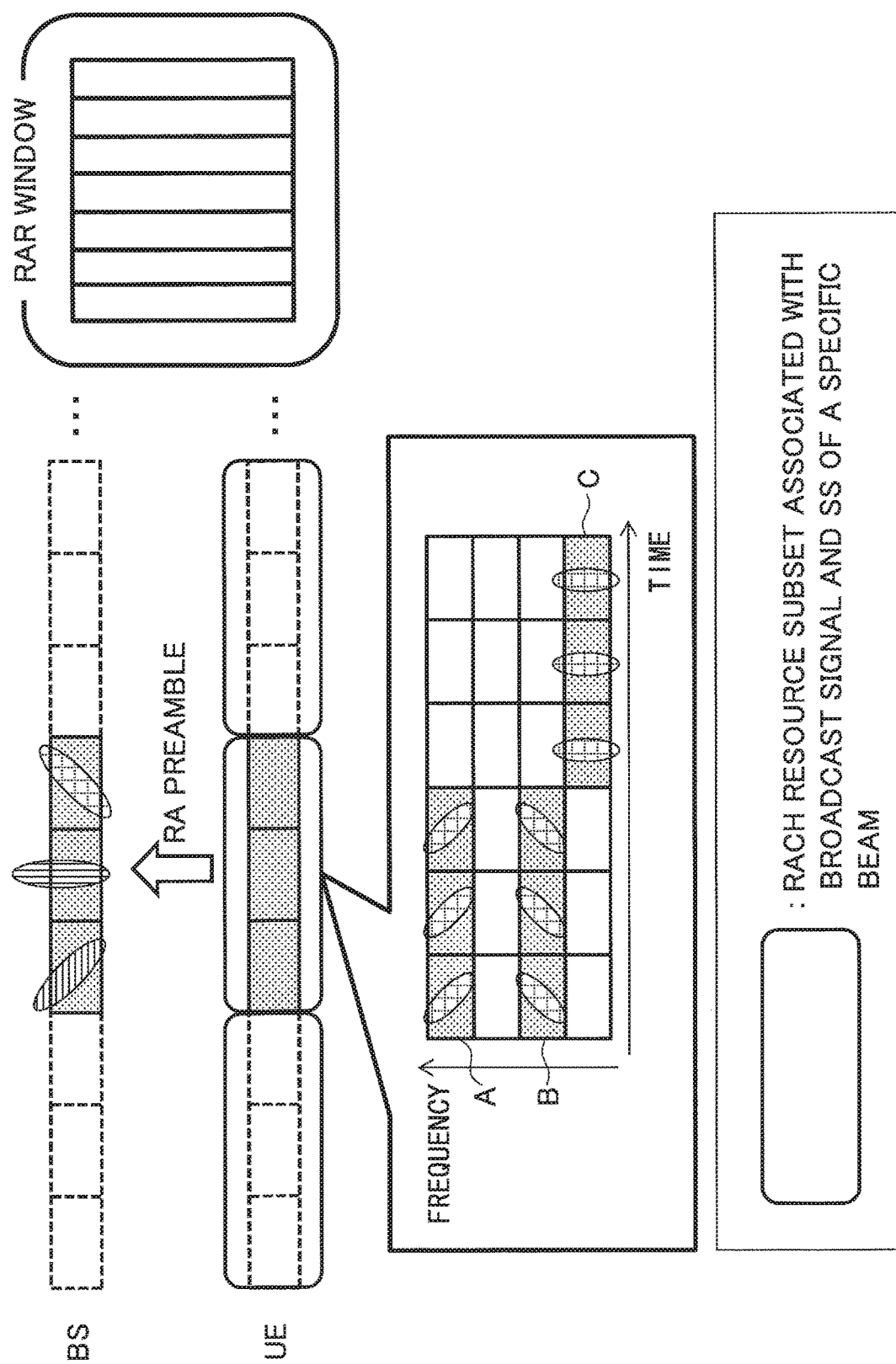
FIG. 5 illustrates a RA preamble transmission method.

Further, as illustrated in FIG. 5, the user apparatus 10 may transmit a RA preamble after multiplexing the RA preamble along a frequency direction and/or a time direction within a RACH resource subset. FIG. 5 illustrates a state where a plurality of units A, B, and C of RA preamble transmission with different UE transmission beams are multiplexed.

Figure 6:
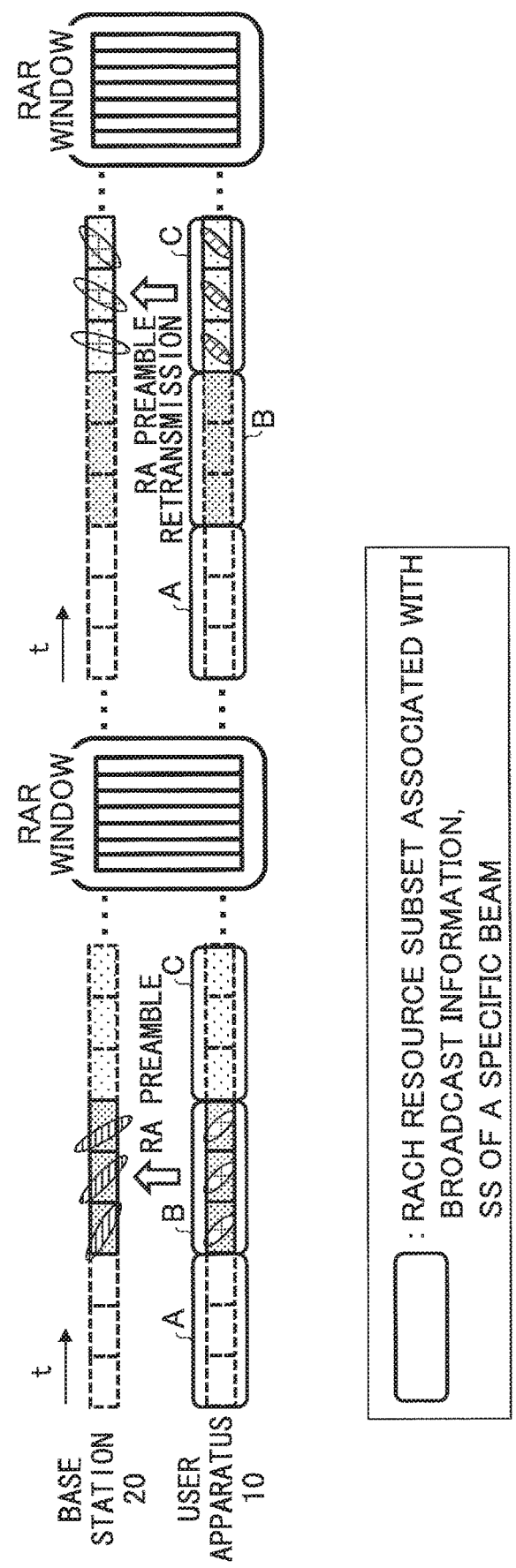
FIG. 6 illustrates an example of retransmission.

Further, FIG. 6 illustrates an example where retransmission is performed. FIG. 6 illustrates a case where at a time of retransmission, the user apparatus 10 transmits a RA preamble with the use of a RACH resource subset different from a RACH resource subset used at a time of first transmission (or at a time of previous retransmission). Further, FIG. 6 also illustrates an example where, at a time of retransmission, a UE transmission beam different from a UE transmission beam used at the previous transmission is used. That is, FIG. 6 also illustrates that beam switching is performed. The user apparatus 10 may perform retransmission with the use of the same RACH resource subset as that used at a time of first transmission (or at a time of previous retransmission). Also in this case, beam switching may be used. Operations of power ramping will be described later concerning the first and second embodiments.

<RACH Resource Subset Notification Method>

According to the present carrying-out mode, the base station 20 transmits information that indicates a RACH resource subset corresponding to a BS transmission beam to the user apparatus 10. The user apparatus 10 can identify the RACH resource subset corresponding to the BS transmission beam for the received broadcast information/SS on the basis of the received information. For example, in a case where the user apparatus 10 selects a BS transmission beam A to transmit a RA preamble in a case where the user apparatus 10 receives information that indicates a RACH resource subset A as a RACH resource subset corresponding to the BS transmission beam A from the base station 20, the user apparatus 10 transmits the RA preamble with the use of the RACH resource subset A.

"Information that indicates a RACH resource subset" sent from the base station 20 to the user apparatus 10 may be information (for example, resource indexes) that indicates time and frequency resources of the RACH resource subset, may be information that indicates time resources (time positions) of the RACH resource subset, or may be other information.

For example, the above-mentioned information is sent for each BS transmission beam with the use of a SIB that is transmitted with the BS transmission beam. Further, a SIB that is transmitted with a BS transmission beam may include information of a RACH resource subset corresponding to another BS transmission beam.

Below, the first and second embodiments will be described as technologies which enable, in a random access procedure where beam switching and power ramping are used, the user apparatus 10 to transmit a RA preamble efficiently. A process that will be described concerning each embodiment can be performed in combination with a process that will be described concerning another embodiment, unless a contradiction arises.

First Embodiment

According to a first embodiment, the user apparatus 10 includes a counter (referred to as Tcounter) that counts the total number of times of transmission, and a power ramping counter that counts the number of times of power ramping for each UE transmission beam (hereinafter, a UE transmission beam will be referred to as a "beam").

Figure 7:
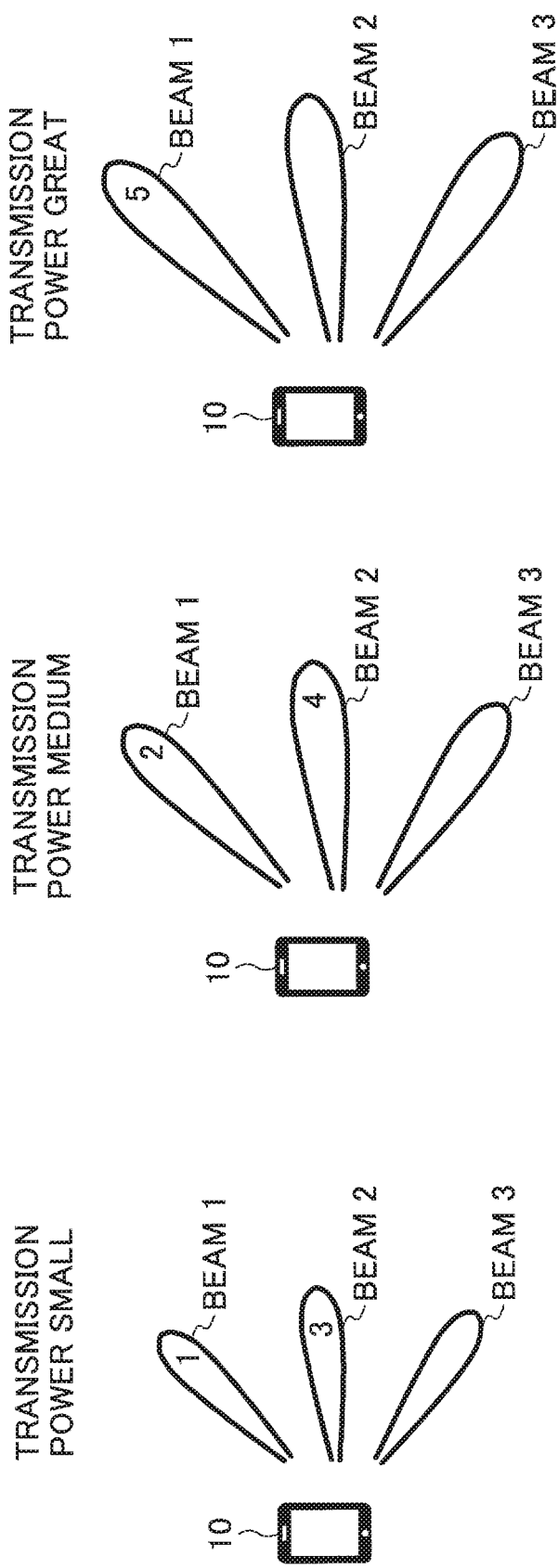
FIG. 7 illustrates an example of operations of a user apparatus 10 according to a first embodiment.

With reference to FIGS. 7 and 8, an example of operations of the user apparatus 10 according to the first embodiment will be described. As illustrated in FIG. 7, in the example of operations, the user apparatus 10 uses three beams. Further, the user apparatus 10 uses, as transmission power, three stages of transmission power, i.e., small, medium, and great transmission power. Note that, using the three stages of transmission power is one example. More stages of transmission power may be used and two stages of transmission power may be used.

The user apparatus 10 has Tcounter that is a counter counting the total number of times of transmission, counter1 that is a counter counting the number of times of power ramping with a beam 1, counter2 that is a counter counting the number of times of power ramping with a beam 2, and counter3 that is a counter counting the number of times of power ramping with a beam 3. Note that, according to the present carrying-out mode, after performing first transmission with a beam, the power ramping counter for the beam is incremented by 1. The counters are implemented by, for example, variables.

In the example illustrated in FIG. 7, first transmission power for each beam is transmission power of "transmission power small". For each beam, in a case where power ramping is performed after transmission of a RA preamble with "transmission power small", transmission of a RA preamble is performed with transmission power of "transmission power medium". Further, for each beam, in a case where power ramping is performed after transmission of a RA preamble with "transmission power medium", transmission of a RA preamble is performed with transmission power of "transmission power great".

For each of "transmission power small", "transmission power medium", and "transmission power great", transmission power may be equal between beams, or may be different therebetween. Further, a difference in transmission power (a transmission power increase step width for power ramping) between "transmission power small" and "transmission power medium" may be equal between beams or may be different therebetween. Further, a difference in transmission power (a transmission power increase step width for power ramping) between "transmission power medium" and "transmission power great" may be equal between beams or may be different therebetween.

In FIG. 7, the numerical values shown in the beams denote the overall sequential numbers of transmissions. FIG. 8 illustrates values of the respective counters. In the example illustrated in FIG. 7, random access is not successful in RA preamble transmission for the first through fourth times (that is, random access is not successful even through three times of retransmission), and random access is successful in the fifth RA preamble transmission.

Further, in the example of FIG. 7, the user apparatus 10 reads a power ramping counter for a beam to be used for RA preamble transmission to identify from the power ramping counter the number of times of already having performed power ramping, and uses transmission power greater by one stage than transmission power corresponding to the identified number of times. It is noted that, at a time of first transmission for each beam, initial transmission power ("transmission power small") is used. Then, after transmission with the initial transmission power ("transmission power small"), the power ramping counter is incremented by 1. Considering that power ramping is performed also for first transmission, the value of a power ramping counter is equal to the number of times of power ramping performed for transmitting a RA preamble. Also in a case where it is not considered that power ramping is performed for first transmission, the value of a power ramping counter indicates the number of times of power ramping performed with respect to transmitting a RA preamble. For example, a fact that a power ramping counter has a value of 3 means that power ramping has been performed twice.

As illustrated in FIG. 7, the user apparatus 10 performs first RA preamble transmission with a beam 1 with the use of initial transmission power. As illustrated in FIG. 8, the user apparatus 10 has, after the first RA preamble transmission, Tcounter=1, counter1=1, counter2=0, and counter3=0.

Next, the user apparatus 10 determines, for example, according to a predetermined rule, to perform second transmission with a beam 1. The user apparatus 10 reads counter1 (=1) that is the power ramping counter for a beam 1, and identifies that the first transmission has been performed with a beam 1. Therefore, the user apparatus 10 determines to use transmission power of "transmission power medium" due to power ramping, and performs second RA preamble transmission with transmission power of "transmission power medium". As illustrated in FIG. 8, the user apparatus 10 has, after the second RA preamble transmission, Tcounter=2, counter1=2, counter2=0, and counter3=0.

Next, the user apparatus 10 determines to perform beam switching from a beam 1 to a beam 2 for performing transmission of a RA preamble. The user apparatus 10 reads counter2 (=0) that is the power ramping counter for a beam 2, and identifies that transmission with a beam 2 has not been performed yet. Therefore, the user apparatus 10 determines to use transmission power of "transmission power small", and performs third RA preamble transmission with transmission power of "transmission power small". As illustrated in FIG. 8, the user apparatus 10 has, after the third RA preamble transmission, Tcounter=3, counter1=2, counter2=1, and counter3=0.

Next, the user apparatus 10 determines to perform fourth transmission with a beam 2. The user apparatus 10 reads counter2 (=1) that is the power ramping counter for a beam 2, and identifies that the first transmission with a beam 2 has been performed. Therefore, the user apparatus 10 determines to use transmission power of "transmission power medium" due to power ramping, and performs fourth RA preamble transmission with transmission power of "transmission power medium". As illustrated in FIG. 8, the user apparatus 10 has, after the fourth RA preamble transmission, Tcounter=4, counter1=2, counter2=2, and counter3=0.

Next, the user apparatus 10 determines to perform beam switching from a beam 2 to a beam 1 to perform fifth transmission with a beam 1. The user apparatus 10 reads counter1(=2) that is the power ramping counter for a beam 1, and identifies that second transmission with a beam 1 has been performed. Therefore, the user apparatus 10 determines to use transmission power of "transmission power great" due to power ramping, and performs fifth RA preamble transmission with transmission power of "transmission power great". As illustrated in FIG. 8, the user apparatus 10 has, after the fifth RA preamble transmission, Tcounter=5, counter1=3, counter2=2, and counter3=0.

Upper limits may be set for a value of the counter that counts the total number of times of transmission and for the power ramping counters for the respective beams, respectively.

The upper limits of the respective counters may be previously stored in the user apparatus 10 and the base station 20, or may be sent from the base station 20 to the user apparatus 10 with the use of, for example, broadcast information/SS, DCI, a MAC signal, or RRC signaling.

For example, the example of FIG. 7 can be interpreted as an example for a case where 5 is set as the upper limit of the counter that counts the total number of times of transmission. In a case of this interpretation, for example, the user apparatus 10 does not perform retransmission of a RA preamble after performing fifth transmission of a RA preamble even in a case where RAR has not been able to be received even after performing the fifth transmission of the RA preamble. Thereafter, for example, the user apparatus 10 performs first transmission of a RA preamble with the use of a different RACH resource subset.

Further, if assuming that, in the example of FIG. 7, the upper limit of each power ramping counter is 2, the user apparatus 10 does not use a beam 1 and does not use a beam 2 for fifth transmission, with each having a counter value that has reached 2 after the fourth transmission. In this case, for example, the user apparatus 10 uses a beam 3 for the fifth transmission, and performs the transmission with transmission power of "transmission power small".

As mentioned above, as a result of the user apparatus 10 having the power ramping counter for each beam, it is possible to avoid using "transmission power great" for the third transmission, which uses a beam 2 switched from a beam 1 due to beam switching, in the example of FIG. 7, for example. Further, for the fifth transmission, which uses a beam 1 switched from beam 2 due to beam switching, the user apparatus 10 can perform transmission with the use of transmission power of the step following from the transmission power of the second transmission of a beam 1 without resetting power ramping.

Therefore, it is possible to avoid inefficient operations such as using uselessly great transmission power or power ramping being reset. That is, in the radio communication system in which beam switching is used for a random access procedure, the user apparatus 10 can efficiently transmit a RA preamble.

Second Embodiment

The user apparatus 10 may give priority to beam switching to perform beam switching each time of retransmission, or may give priority to power ramping to perform power ramping without performing beam switching until the greatest transmission power is reached for a beam. According to a second embodiment, the base station 20 sends information of a retransmission scheme that is preferential from among beam switching and power ramping to the user apparatus 10, and the user apparatus 10 performs RA preamble transmission operation according to the retransmission scheme in the information which has been sent. Sending of information of a retransmission scheme from the base station 20 to the user apparatus 10 is implemented with the use of, for example, broadcast information/SS, DCI, a MAC signal, or RRC signaling.

Figure 9:
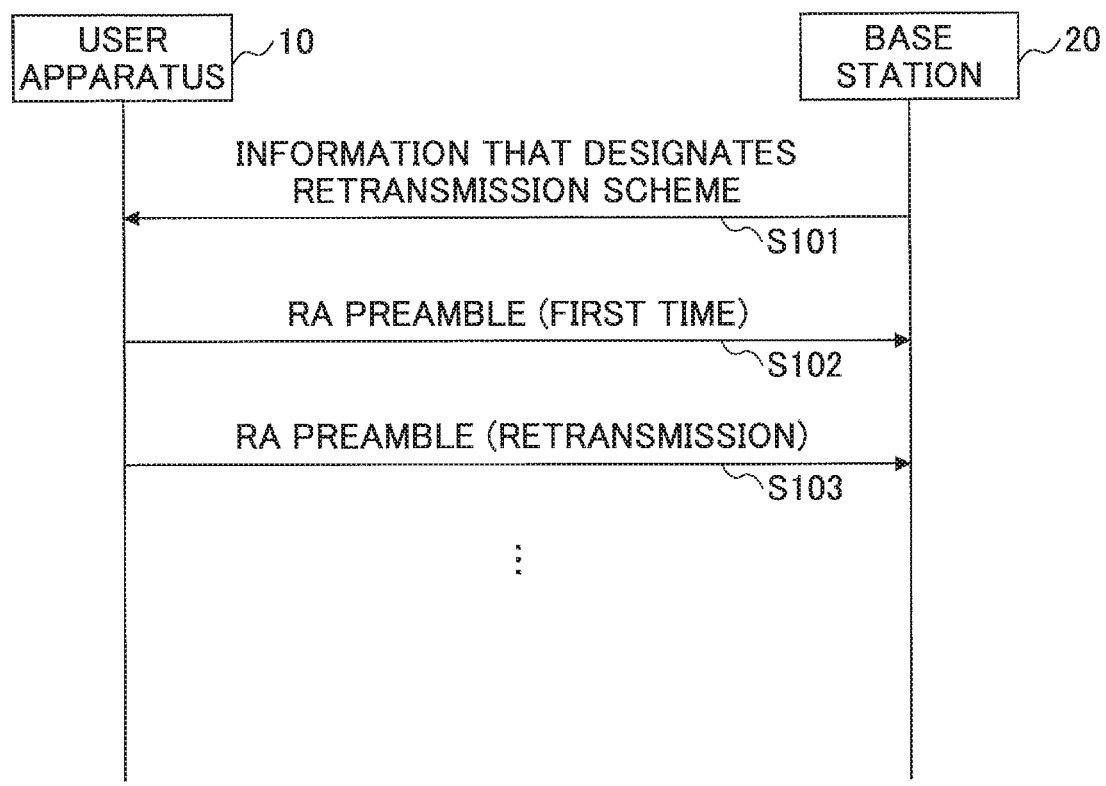
FIG. 9 illustrates a sequence diagram according to a second embodiment.

FIG. 9 illustrates an example of a sequence according to the second embodiment. In step S101, the base station 20 sends information of a preferential retransmission scheme (here, beam switching or power ramping) to the user apparatus 10. The user apparatus 10 performs transmission or retransmission of a RA preamble according to the information sent in step S101 (steps S102 and S103).

Figure 10:
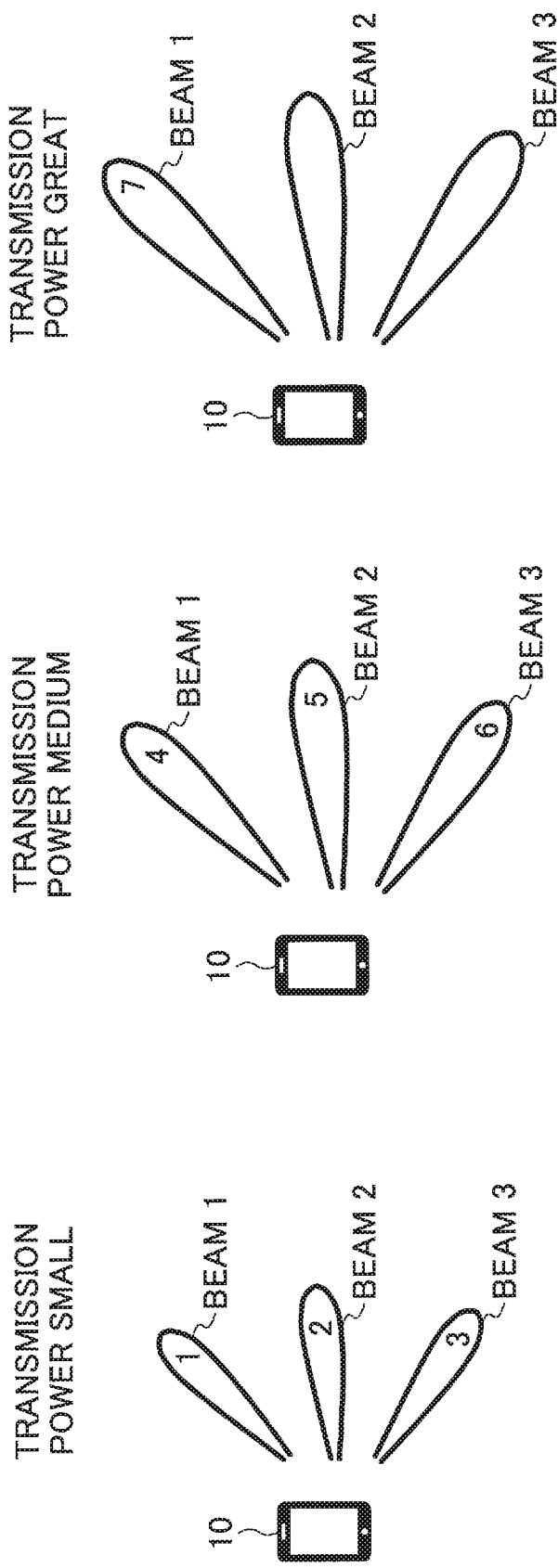
FIG. 10 illustrates an example of operations of a user apparatus 10 according to the second embodiment.

FIGS. 10 and 11 illustrate an example of operations performed in a case where, in step S101 of FIG. 9, information of beam switching is sent as information of a preferential retransmission scheme. The user apparatus 10 has the same counters as the respective counters described above for the first embodiment.

As illustrated in FIG. 10, the user apparatus 10 performs first RA preamble transmission with a beam 1 with the use of initial transmission power. As illustrated in FIG. 11, the user apparatus 10 has, after the first RA preamble transmission, Tcounter=1, counter1=1, counter2=0, counter3=0.

Next, the user apparatus 10 determines to perform second transmission with a beam 2. The user apparatus 10 reads counter1 (=0) that is the power ramping counter for a beam 2, to identify that transmission with a beam 2 has not been performed yet. Therefore, the user apparatus 10 determines to use transmission power of "transmission power small", and performs second RA preamble transmission with transmission power of "transmission power small". As illustrated in FIG. 11, the user apparatus 10 has, after the second RA preamble transmission, Tcounter=2, counter1=1, counter2=1, and counter3=0.

Next, the user apparatus 10 determines to perform transmission of a RA preamble with a beam 3. The user apparatus 10 reads counter3(=0) that is the power ramping counter for a beam 3, to identify that transmission with a beam 3 has not been performed yet. Therefore, the user apparatus 10 determines to use transmission power of "transmission power small", and performs third RA preamble transmission with transmission power of "transmission power small". As illustrated in FIG. 11, the user apparatus 10 has, after the third RA preamble transmission, Tcounter=3, counter1=1, counter2=1, and counter3=1.

Next, the user apparatus 10 determines to perform fourth transmission with a beam 1. The user apparatus 10 reads counter1 (=1) that is the power ramping counter for a beam 1, to identify that first transmission with a beam 1 has been performed. Therefore, the user apparatus 10 determines to use transmission power of "transmission power medium" due to power ramping, and performs fourth RA preamble transmission with transmission power of "transmission power medium". As illustrated in FIG. 11, the user apparatus 10 has, after the fourth RA preamble transmission, Tcounter=4, counter1=2, counter2=1, and counter3=1. Thereafter, the same processing will be performed.

Figure 12:
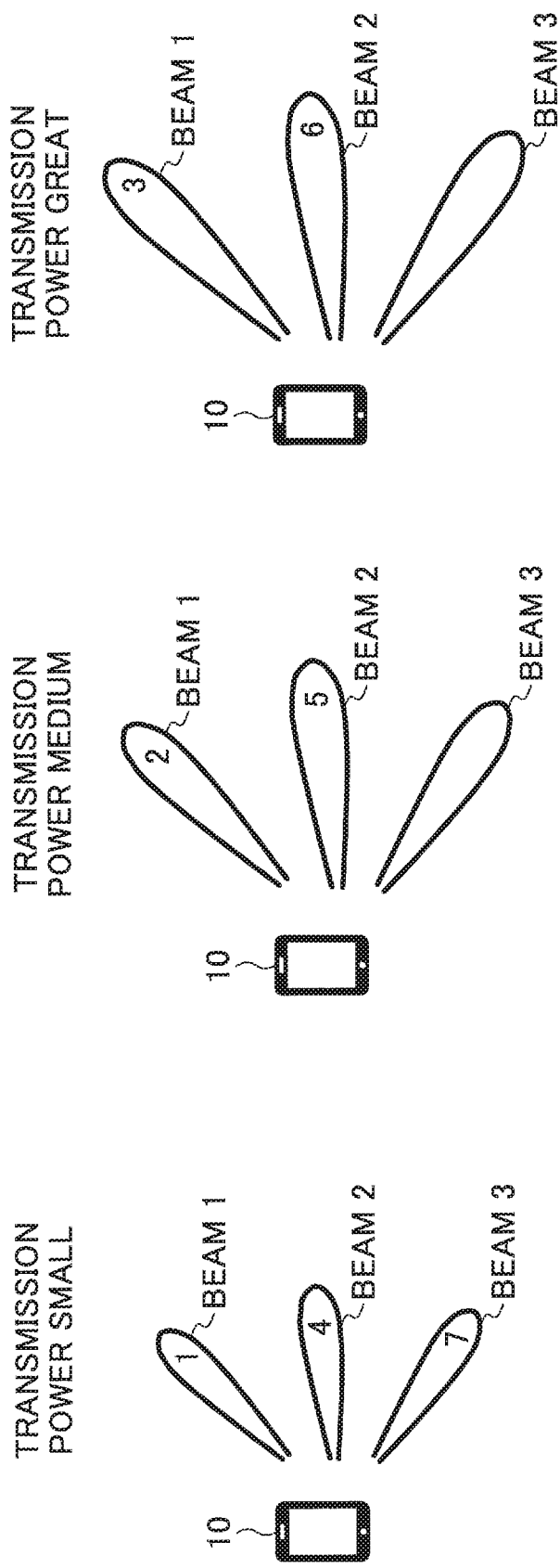
FIG. 12 illustrates an example of operations of the user apparatus 10 according to the second embodiment.

FIGS. 12 and 13 illustrate an example of operations performed in a case where, in step S101 of FIG. 9, information of power ramping is sent as information of a preferential retransmission scheme. The user apparatus 10 has the same counters as the respective counters described above for the first embodiment.

As illustrated in FIG. 12, the user apparatus 10 performs first RA preamble transmission with a beam 1 with the use of initial transmission power. As illustrated in FIG. 13, the user apparatus 10 has, after the first RA preamble transmission, Tcounter=1, counter1=1, counter2=0, and counter3=0.

Next, the user apparatus 10 determines to perform second transmission with a beam 1. The user apparatus 10 reads counter1 (=1) that is the power ramping counter for a beam 1, to identify that first transmission with a beam 1 has been performed. Therefore, the user apparatus 10 determines to use transmission power of "transmission power medium", and performs second RA preamble transmission with transmission power of "transmission power medium". As illustrated in FIG. 13, the user apparatus 10 has, after the second RA preamble transmission, Tcounter=2, counter1=2, counter2=0, and counter3=0.

Next, the user apparatus 10 determines to perform third transmission with a beam 1. The user apparatus 10 reads counter1 (=2) that is the power ramping counter for a beam 1, to identity that second transmission with a beam 1 has been performed. Therefore, the user apparatus 10 determines to use transmission power of "transmission power great", and performs third RA preamble transmission with transmission power of "transmission power great". As illustrated in FIG. 13, the user apparatus 10 has, after the third RA preamble transmission, Tcounter=3, counter1=3, counter2=0, and counter3=0.

Next, the user apparatus 10 determines to perform transmission of a RA preamble with a beam 2. The user apparatus 10 reads counter2 (=0) that is the power ramping counter for a beam 2, to identify that transmission with a beam 2 has not been performed yet. Therefore, the user apparatus 10 determines to use transmission power of "transmission power small", and performs fourth RA preamble transmission with transmission power of "transmission power small". As illustrated in FIG. 13, the user apparatus 10 has, after the fourth RA preamble transmission, Tcounter=3, counter1=3, counter2=1, and counter3=0. Thereafter, the same processing will be performed.

Also according to the second embodiment, in the same manner as the first embodiment, in a radio communication system in which beam switching is used in a random access procedure, the user apparatus 10 can efficiently transmit a RA preamble.

(Apparatus Configuration)

Next, an example of a function configuration of the user apparatus 10 and the base station 20 that perform the above-described processing operations will be described. Each of the user apparatus 10 and the base station 20 includes at least functions for implementing the first and second embodiments. However, each of the user apparatus 10 and the base station 20 may include only some functions of the first and second embodiments.

<User Apparatus>

Figure 14:
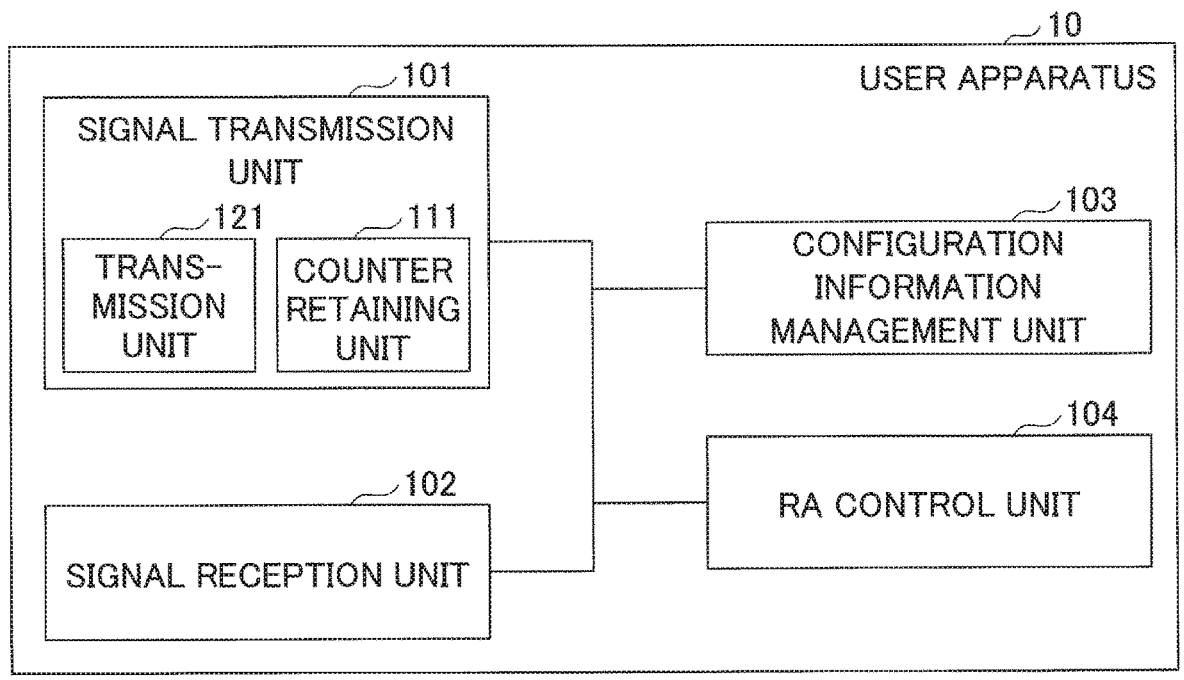
FIG. 14 illustrates an example of a function configuration of the user apparatus 10.

FIG. 14 illustrates an example of a function configuration of the user apparatus 10. As illustrated in FIG. 14, the user apparatus 10 includes a signal transmission unit 101, a signal reception unit 102, a configuration information management unit 103, and a RA control unit 104. The function configuration illustrated in FIG. 14 is merely one example. Function classifications and names of function units thereof can be any classifications and names as long as operations according to the present carrying-out mode can be implemented.

The signal transmission unit 101 creates a transmission signal from transmission data, and transmits the transmission signal wirelessly. The signal reception unit 102 receives various signals wirelessly, and acquires signals of higher layers from the received signals of physical layers.

The configuration information management unit 103 stores various configuration information received from the base station 20 via the signal reception unit 102. Further, the configuration information management unit 103 stores also configuration information that is previously set. The contents of the configuration information are, for example, the upper limits of the respective counters, information of a retransmission scheme in the second embodiment, other parameters, and so forth.

The RA control unit 104 performs control of a random access procedure in the user apparatus 10 described above for the basic example and the first and second embodiments. In this regard, it is possible to include, in the signal transmission unit 101, a function unit concerning signal transmission included in the RA control unit 104, and include, in the signal reception unit 102, a function unit concerning signal reception included in the RA control unit 104.

The signal transmission unit 101 includes a counter retaining unit 111 and a transmission unit 121. The transmission unit 121 is configured to transmit a random access preamble with a beam out of a plurality of beams, for example. The counter retaining unit 111 is configured to have, for each beam, a counter that counts the number of times of power ramping performed in transmission of a random access preamble. The counter retaining unit 111 may be called a counter storing unit.

Note that operations of incrementing the counters along with power ramping may be performed by the counter retaining unit 111 or the transmission unit 121.

Further, the transmission unit 121 is configured to determine transmission power to be used for transmitting a random access preamble with a beam on the basis of the value of the counter corresponding to the beam to be used to transmit the random access preamble. Further, an upper limit may be set for the counter for each beam, and the transmission unit 121 may avoid using, for transmitting a random access preamble, a beam for which the counter has the value that has reached the upper limit. The counter retaining unit 111 may further have a transmission counter that counts the total number of times of transmission of a random access preamble, and the transmission unit 121 can perform transmission or retransmission of a random access preamble up to the number of times equal to the upper limit of the transmission counter.

<Base Station 20>

Figure 15:
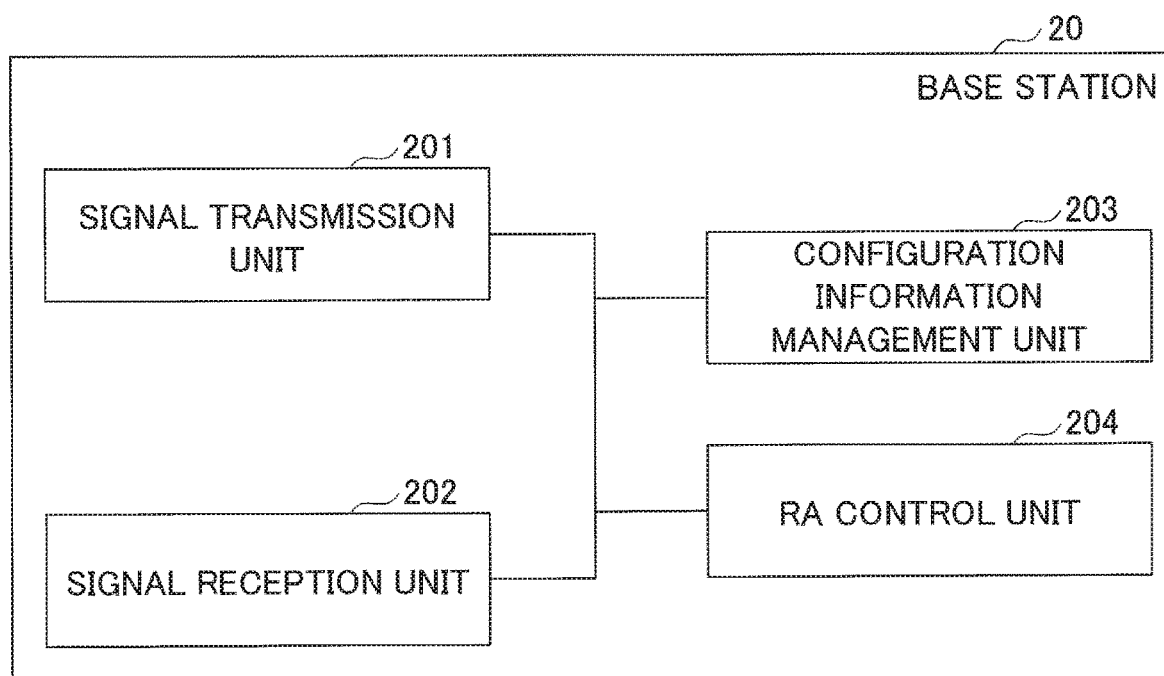
FIG. 15 illustrates an example of a function configuration of the base station 20.

FIG. 15 illustrates an example of a function configuration of the base station 20. As illustrated in FIG. 15, the base station 20 includes a signal transmission unit 201, a signal reception unit 202, a configuration information management unit 203, and a RA control unit 204. The function configuration illustrated in FIG. 15 is merely one example. Function classifications and names of function units thereof can be any classifications and names as long as operations according to the present carrying-out mode can be implemented.

The signal transmission unit 201 includes functions of generating a signal to transmit to the user apparatus 10 and transmitting the signal wirelessly. The signal reception unit 202 includes functions of receiving various types of signals transmitted from the user apparatus 10 and acquiring, for example, information of a higher layer from the received signals.

The configuration information management unit 203 stores configuration information that is previously set and various configuration information to be transmitted to the user apparatus 10. The contents of the configuration information are, for example, the upper limits of the respective counters, information of a retransmission scheme in the second embodiment, other parameters, and so forth.

The RA control unit 204 performs control of a random access procedure in the base station 20 described above for the basic example and the first and second embodiments. In this regard, it is possible to include, in the signal transmission unit 201, a function unit concerning signal transmission included in the RA control unit 204, and include, in the signal reception unit 202, a function unit concerning signal reception included in the RA control unit 204.

<Hardware Configuration>

The block diagrams used in the description for the above-mentioned embodiments (FIGS. 14 and 15) illustrate blocks in function units. These function blocks (configuration units) are implemented by an arbitrary combination of hardware and/or software. In this regard, means for implementing the respective function blocks are not limited. That is, each function block may be implemented by one unit that is a physical and/or logical combination of a plurality of elements. Alternatively, each function block may be implemented by two or more devices that are physically and/or logically separated and directly and/or indirectly (for example, in a wired and/or wireless manner) connected together.

Figure 16:
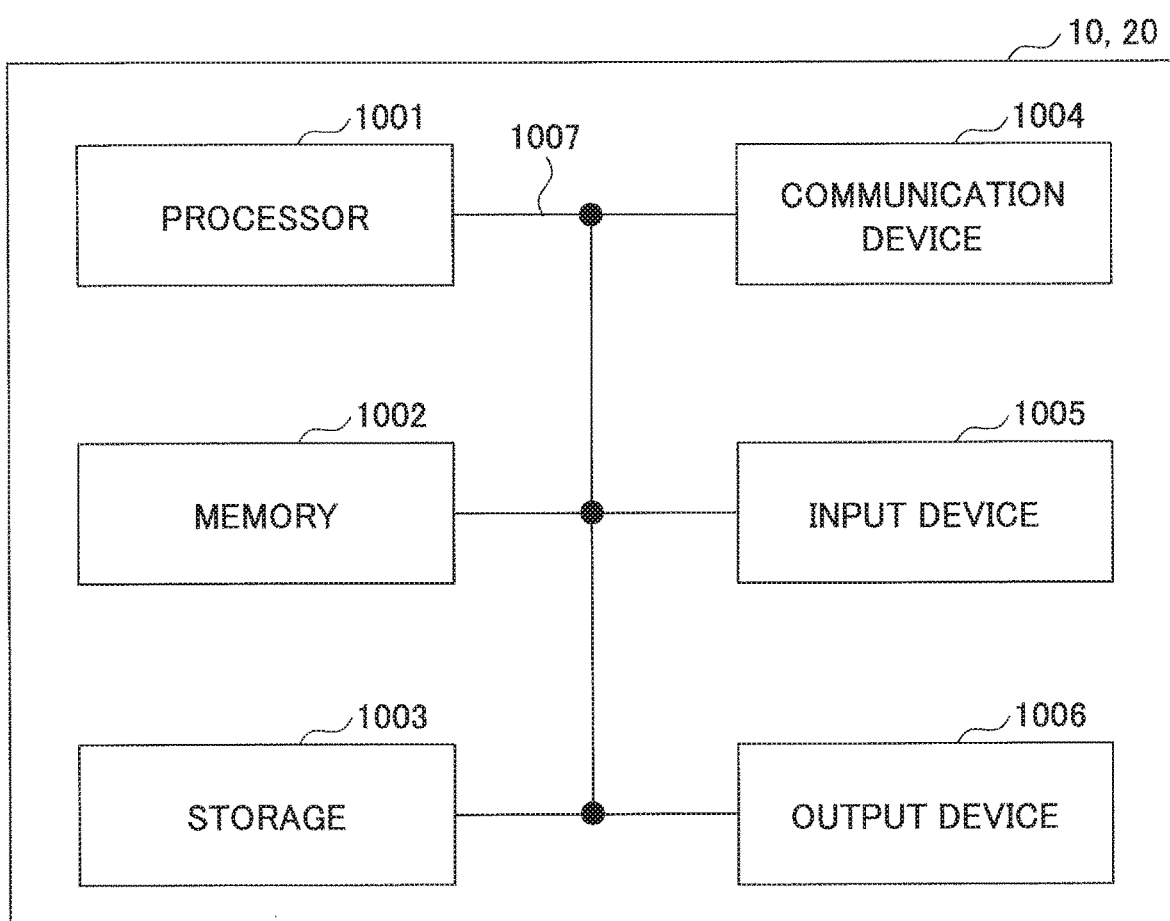
FIG. 16 illustrates an example of a hardware configuration of the user apparatus 10 and the base station 20.

Further, for example, each of the user apparatus 10 and the base station 20 according to the mode for carrying out the present invention may function as a computer that performs the processing according to the present carrying-out mode. FIG. 16 illustrates an example of a hardware configuration of the user apparatus 10 and the base station 20 according to the present carrying-out mode. Each of the above-described user apparatus 10 and base station 20 may be configured as a computer apparatus that physically includes a processor 1001, a memory 1002, a storage 1003, a communication device 1004, an input device 1005, an output device 1006, a bus 1007, and so forth.

Note that, below, the term "device" may be read as a circuit, a unit, or the like. The hardware configuration of the user apparatus 10 and the base station 20 may be configured to include one or more of the devices 1001-1006 illustrated, or may be configured not to include some of the devices 1001-1006 illustrated.

Each function in the user apparatus 10 and the base station 20 is implemented as a result of hardware such as the processor 1001 and the memory 1002 reading predetermined software (program), and thereby the processor 1001 performing operations to control communication by the communication device 1004 and control reading data from and/or writing data to the memory 1002 and the storage 1003.

The processor 1001 controls the entirety of the computer by causing an operating system to operate, for example. The processor 1001 may include a central processing unit (CPU) that includes an interface for a peripheral device, a control device, an arithmetic device, a register, and so forth.

Further, the processor 1001 reads a program (program code), a software module, or data from the storage 1003 and/or the communication device 1004 onto the memory 1002, and thus implements various processes according to the read information. As the program, a program that causes the computer to perform at least some of the operations described above for the above-mentioned carrying-out mode is used. For example, the signal transmission unit 101, the signal reception unit 102, the configuration information management unit 103, and the RA control unit 104 of the user apparatus 10 illustrated in FIG. 14 may be implemented by a control program that is stored in the memory 1002 and operates with the processor 1001. Further, for example, the signal transmission unit 201, the signal reception unit 202, the configuration information management unit 203, and the RA control unit 204 of the base station 20 illustrated in FIG. 15 may be implemented by a control program that is stored in the memory 1002 and operates with the processor 1001. In this regard, it has been described that the various processes described above are implemented by the single processor 1001. However, the various processes may be implemented by two or more processors 1001 simultaneously or sequentially. The processor 1001 may include one or more chips. The programs may be transmitted from a network through an electric communication line.

The memory 1002 is a computer readable recording medium, and includes, for example, at least one of a ROM (Read-Only Memory), an EPROM (Erasable Programmable ROM), an EEPROM (Electrically Erasable Programmable ROM), a RAM (Random Access Memory), and so forth. The memory 1002 may be called a register, a cache, a main memory (main storage), or the like. The memory 1002 can store the program, the software module, or the like executable for implementing the processing according to the mode for carrying out the present invention.

The storage 1003 is a computer readable recording medium and includes, for example, at least one of an optical disc such as a CD-ROM (Compact Disc ROM), a hard disk drive, a flexible disk, a magneto-optical disc (for example, a compact disc, a digital versatile disc, a Blu-ray (registered trademark) disc), a smart card, a flash memory (for example, a card, a stick, or a key drive), a floppy (registered trademark) disk, a magnetic strip, and so forth. The storage 1003 may be called an auxiliary storage device. The above-described recording medium may be, for example, a suitable medium such as a database, a server, or the like that includes the memory 1002 and/or storage 1003.

The communication device 1004 is hardware (a transmission and reception device) for performing communication between computers through a wired and/or wireless network and may also be called, for example, a network device, a network controller, a network card, a communication module, or the like. For example, the signal transmission unit 101 and the signal reception unit 102 of the user apparatus 10 may be implemented by the communication device 1004. Further, the signal transmission unit 201 and the signal reception unit 202 of the base station 20 may be implemented by the communication device 1004.

The input device 1005 is an input device (for example, a keyboard, a mouse, a microphone, a switch, a button, a sensor, or the like) that receives an input from the outside. The output device 1006 is an output device (for example, a display, a speaker, a LED light, or the like) that outputs information to the outside. The input device 1005 and the output device 1006 may be configured as one unit (for example, a touch panel).

Further, the respective devices such as the processor 1001 and the memory 1002 are connected together via a bus 1007 for sending and receiving information therebetween. The bus 1007 may include a single bus or may include respective different buses depending on the corresponding devices.

Further, each of the user apparatus 10 and the base station 20 may include hardware such as a microprocessor, a digital signal processor (DSP), an ASIC (Application Specific Integrated Circuit), a PLD (Programmable Logic Device), or a FPGA (Field Programmable Gate Array). The hardware may implement some or all of the respective function blocks. For example, the processor 1001 may be implemented by at least one of these hardware units.

(Summary of Carrying-Out Mode)

As described above, according to the present carrying-out mode, a user apparatus in a radio communication system that includes a base station and the user apparatus includes a transmission unit that transmits a random access preamble with the use of a beam out of a plurality of beams; and a counter retaining unit that has, for each beam, a counter that counts the number of times of power ramping performed in transmission of a random access preamble.

Thanks to the above-mentioned configuration, in a radio communication system in which beam switching is used in a random access procedure, a user apparatus can efficiently transmit a random access preamble.

The transmission unit may determine transmission power to be used to transmit a random access preamble with a beam on the basis of a value of a counter corresponding to the beam to be used to transmit the random access preamble. Thanks to this configuration, it is possible to appropriately perform power ramping suitable for a beam to be used.

An upper limit may be set for the counter for each beam, and the transmission unit may avoid using a beam for which the corresponding counter has reached the upper limit for transmitting a random access preamble. Thanks to this configuration, it is possible to avoid the number of times of power ramping from being excessively great.

The counter retaining unit may further have a transmission counter that counts the total number of times of transmission, and the transmission unit may perform transmission up to the number of times equal to the upper limit of the transmission counter. Thanks to this configuration, it is possible to avoid the total number of times of transmission from being excessively great.

Further, according to the present carrying-out mode, a random access preamble transmission method is provided that is performed by a user apparatus in a radio communication system that includes a base station and the user apparatus. The user apparatus includes a counter retaining unit that has, for each beam, a counter that counts the number of times of power ramping performed in transmitting a random access preamble. The random access preamble transmission method includes a transmission step of transmitting a random access preamble with the use of a beam out of a plurality of beams; and a step of incrementing a value of the counter corresponding to the beam used in the transmission step.

Thanks to the above-mentioned configuration, in a radio communication system in which a beam switching is used in a random access procedure, a user apparatus can efficiently transmit a random access preamble.

(Supplement to Carrying-Out Mode)

Thus, the mode for carrying out the present invention has been described. However, the disclosed invention is not limited to such a mode for carrying out the present invention, and the person skilled in the art will understand various variants, modified examples, replacement examples, and so forth. Although specific numerical values have been used as examples for promoting understanding of the invention, the numerical values are merely examples unless otherwise noted, and any other suitable values may be used instead. The classifications of items in the above description are not essential to the present invention, matters described in two or more items may be used in combination if necessary, and a matter described in an item may be used as a matter described in another item (unless a contradiction arises). Boundaries between function units or processing units are not necessarily boundaries of physical components. Operations of a plurality of function units may be physically implemented by a single component, and an operation of a single function unit may be physically implemented by a plurality of components. Concerning processing procedures according to the mode for carrying out the present invention, the order of processing steps may be changed unless a contradiction arises. For the sake of convenience for describing processing, the user apparatus 10 and the base station 20 have been described with the use of the functional block diagrams. However, these apparatuses may be implemented with hardware, software, or a combination thereof. Each of the software that is executed by the processor of the user apparatus 10 according to the mode for carrying out the present invention and the software that is executed by the processor of the base station 20 according to the mode for carrying out the present invention may be stored in any suitable recording medium such as a random access memory (RAM), a flash memory, a read-only memory (ROM), an EPROM, an EEPROM, a register, a hard disk (HDD), a removable disk, a CD-ROM, a database, or a server.

Further, sending of information may be implemented not only according to the mode for carrying out the present invention herein but also by another method. For example, sending of information may be implemented with the use of physical layer signaling (for example, DCI (Downlink Control Information) or UCI (Uplink Control Information)), upper layer signaling (for example, RRC (Radio Resource Control) signaling, MAC (Medium Access Control) signaling, broadcast information (a MIB (Master Information Block), or a SIB (System Information Block)), or other signal, or a combination thereof. Further, RRC signaling may be called a RRC message, and, for example, may be a RRC Connection Setup message, a RRC Connection Reconfiguration message, or the like.

Each mode for carrying out the present invention described herein may be used in a system that uses a suitable system such as LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), or Bluetooth (registered trademark), and/or a next-generation system expanded on the basis thereof.

Concerning the processing procedures, sequences, flowcharts, and so forth according to each mode for carrying out the present invention described herein, the orders of processing steps may be changed unless a contradiction arises. For example, concerning the methods described herein, various step elements are illustrated in example orders, and orders thereof are not limited to the illustrated specific orders.

Specific operations performed by the base station 20 described herein may in some cases be performed by an upper node. It is clear that various operations performed for communication with the user apparatus 20 can be performed by the base station 20 and/or another network node (for example, a MME, a S-GW or the like may be cited, but not limited thereto) in a network that includes one or more network nodes including the base station 20. Thus, the above-mentioned network node other than the base station 20 is a single node for example. However, the above-mentioned network node other than the base station 20 may be a combination of a plurality of other network nodes (for example, a MME and a S-GW).

Each mode for carrying out the present invention described herein may be solely used, may be used in combination with another carrying-out mode, or may be used in a manner of being switched with another carrying-out mode at a time of being performed.

By the person skilled in the art, the user apparatus 10 may be called any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

By the person skilled in the art, the base station 20 may be called any one of a NB (NodeB), an eNB (enhanced NodeB), a gNB, and other suitable terms.

The term "to determine" used herein may mean various operations. For example, "to determine" may mean to consider having determined to have performed judging, calculating, computing, processing, deriving, investigating, looking up (for example, looking up a table, a database, or another data structure), or ascertaining, or the like. Also, "to determine" may mean to consider having determined to have performed receiving (for example, receiving information), transmitting (for example, transmitting information), inputting, outputting, or accessing (for example, accessing data in a memory), or the like. Also, "to determine" may mean to consider having determined to have performed resolving, selecting, choosing, establishing, comparing, or the like. That is, "to determine" may mean to consider having determined a certain operation.

Words "based on" or "on the basis of" used herein do not mean "based on only" or "on the basis of only" unless otherwise specified. That is, the words "based on" or "on the basis of" mean both "based on only" and "based on at least" or both "on the basis of only" and "on the basis of at least".

As long as any one of "include", "including", and variations thereof is used herein or the claims, this term has an intended meaning of inclusiveness in the same way as the term "comprising". Further, the term "or" used herein or the claims has an intended meaning of not exclusive-or.

Throughout the present disclosure, in a case where an article such as a, an, or the in English is added through a translation, the article may be of a plural form unless the context clearly indicates otherwise.

Thus, the present invention has been described in detail. In this regard, it is clear that the person skilled in the art understands that the present invention is not limited to the mode for carrying out the present invention described herein. The present invention can be implemented in a modified or changed mode without departing from the effect and the scope of the present invention. Therefore, the description herein is for the illustrative purpose and does not have any restrictive meaning.

DESCRIPTION OF REFERENCE SIGNS 10 user apparatus
101 signal transmission unit
102 signal reception unit
103 configuration information management unit
104 RA control unit
20 base station
201 signal transmission unit
202 signal reception unit
203 configuration information management unit
204 RA control unit
1001 processor
1002 memory
1003 storage
1004 communication device
1005 input device
1006 output device

The invention claimed is:

1. A terminal in a radio communication system that includes a base station and the terminal, the terminal comprising:
a transmitter that transmits a random access preamble with the use of a beam out of a plurality of beams; and
a processor that has, for each beam, a counter that indicates the number of times of power ramping performed in transmission of a random access preamble,
wherein the transmitter determines transmission power to be used to transmit a random access preamble with a beam on the basis of a value of the counter corresponding to the beam to be used to transmit the random access preamble, and
wherein, in accordance with information of a retransmission scheme received from the base station, the processor gives priority to beam switching to perform beam switching each time of retransmission of the random access preamble or gives priority to power ramping to perform power ramping without performing beam switching until reaching a greatest transmission power for a beam.

2. The terminal according to claim 1, wherein
an upper limit is set for the counter for each beam, and the transmitter does not use, for transmitting a random access preamble, a beam for which a value of the counter has reached the upper limit.

3. The terminal according to claim 1, wherein
the processor further includes a transmission counter that counts the total number of times of transmitting a random access preamble, and
the transmitter performs transmission of a random access preamble up to the number of times equal to an upper limit of the transmission counter.

4. The terminal according to claim 2, wherein
the processor further includes a transmission counter that counts the total number of times of transmitting a random access preamble, and
the transmitter performs transmission of a random access preamble up to the number of times equal to an upper limit of the transmission counter.

5. A random access preamble transmission method performed by a terminal included in a radio communication system that includes a base station and the terminal, wherein
the terminal includes a processor that has, for each beam, a counter that counts the number of times of power ramping performed in transmitting a random access preamble, and
the random access preamble transmission method comprises:
transmitting a random access preamble with the use of a beam out of a plurality of beams;
incrementing a value of the counter corresponding to the beam used in the transmitting; and
determining transmission power to be used to transmit a random access preamble with a beam on the basis of a value of the counter corresponding to the beam to be used to transmit the random access preamble,
wherein in accordance with information of a retransmission scheme received from the base station, giving priority to beam switching to perform beam switching each time of retransmission of the random access preamble or giving priority to power ramping to perform power ramping without performing beam switching until reaching a greatest transmission power for a beam.

* * * * *